United States Patent
Ido

(10) Patent No.: US 7,221,932 B2
(45) Date of Patent: May 22, 2007

(54) INFORMATION PROCESSING APPARATUS, FUNCTION EXPANSION DEVICE, AND CONTROL METHOD THEREFOR

(75) Inventor: Tetsuo Ido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/980,557

(22) Filed: Nov. 3, 2004

(65) Prior Publication Data

US 2005/0101316 A1 May 12, 2005

(30) Foreign Application Priority Data

Nov. 7, 2003 (JP) .............................. 2003-378115

(51) Int. Cl.
*H04M 1/66* (2006.01)

(52) U.S. Cl. ........................ 455/411; 380/247; 380/250

(58) Field of Classification Search ............. 455/556.1, 455/411, 557, 575.2
See application file for complete search history.

(56) References Cited

U.S. PATENT DOCUMENTS

| 2002/0147819 | A1 | 10/2002 | Miyakoshi |
| 2003/0092395 | A1 | 5/2003 | Kazuhito |
| 2004/0198430 | A1* | 10/2004 | Moriyama et al. ........ 455/556.1 |

FOREIGN PATENT DOCUMENTS

| JP | 11-265337 | 9/1999 |
| JP | 2002312155 | 10/2002 |

\* cited by examiner

*Primary Examiner*—Nick Corsaro
*Assistant Examiner*—Huy Ho

(57) ABSTRACT

Installation (wired connection) of a function expansion device in a portable information terminal is detected. This detection causes a connection authentication code to be generated. The generated connection authentication code is stored in each of the portable information terminal and the function expansion device via a wire circuit so as to be used for authentication for wireless connection.

11 Claims, 4 Drawing Sheets

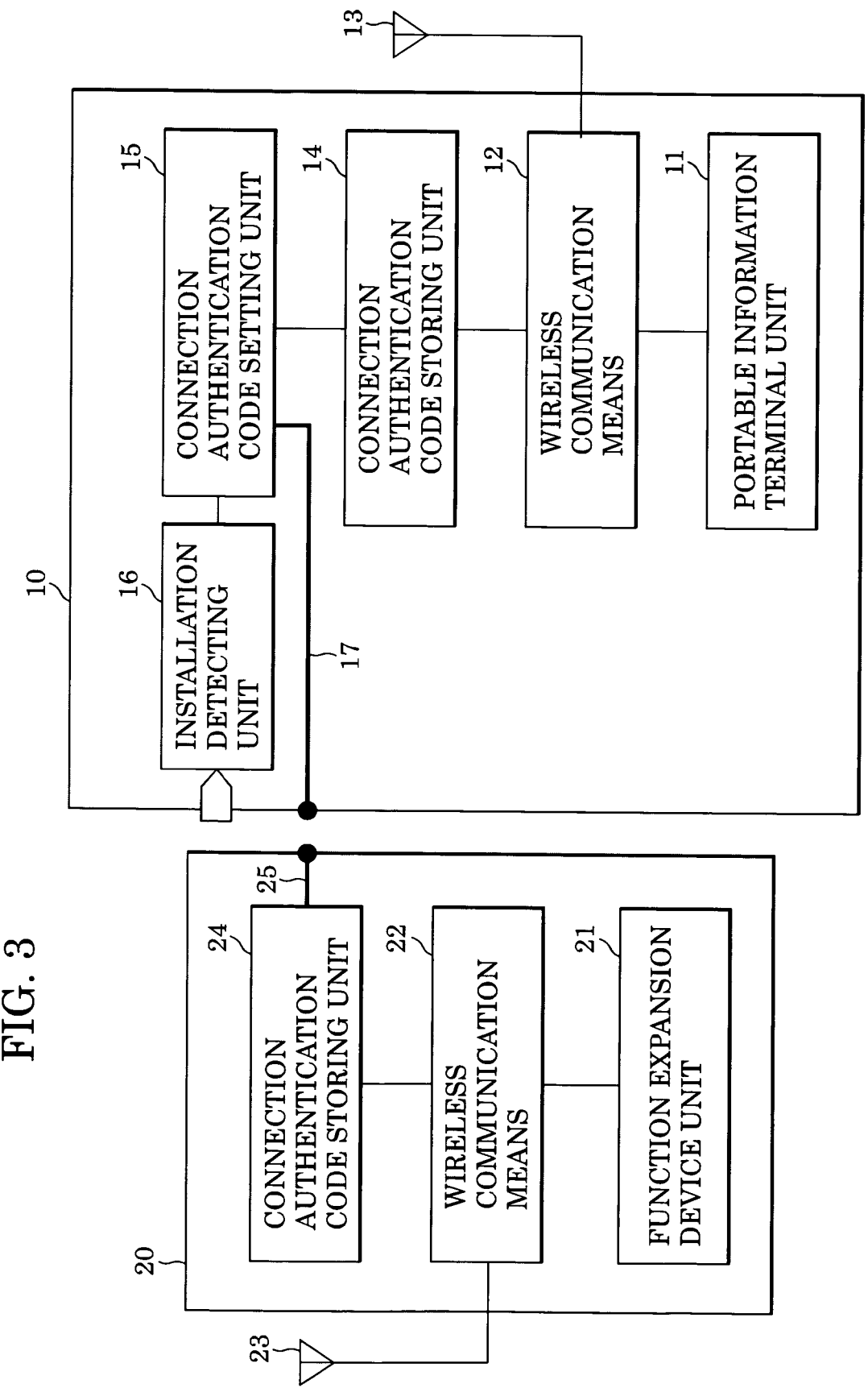

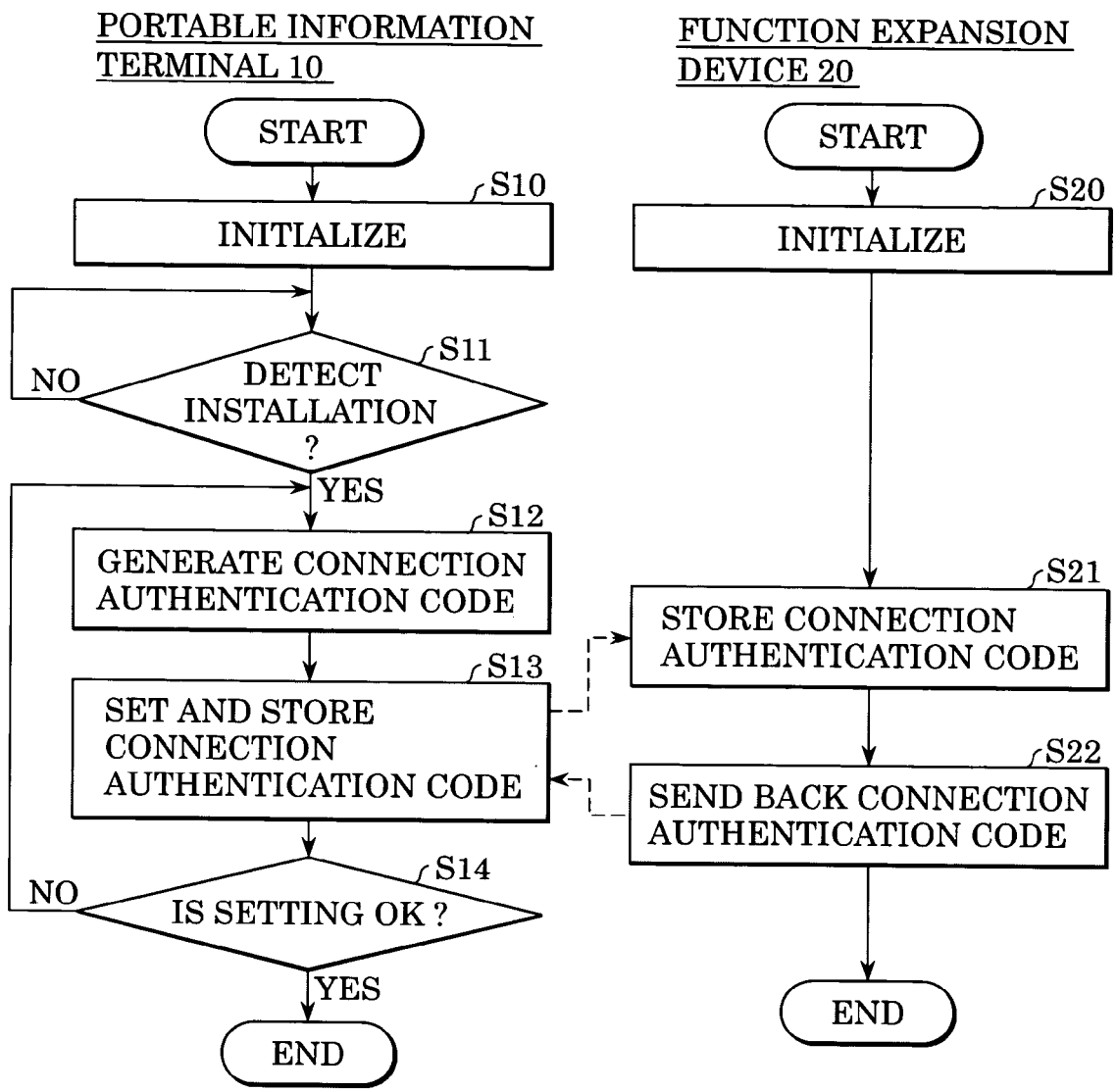

INFORMATION PROCESSING APPARATUS, FUNCTION EXPANSION DEVICE, AND CONTROL METHOD THEREFOR This application claims priority from Japanese Patent Application No. 2003-378115 filed Nov. 7, 2003, which is hereby incorporated by reference herein.

BACKGROUND OF THE INVENTION

1. Field of the Invention

The present invention relates to technologies for performing connection authentication in information processing apparatuses and function expansion devices that are capable of wired connection and wireless connection.

2. Description of the Related Art

Portable information terminals, such as personal digital assistants (PDAs) and cellular telephones, provided with a function expansion device including a speaker, a microphone, a headphone, a keyboard, a mouse, an external storage device, a laser bar code reader, a camera adapter, a global positioning system (GPS) adapter, and various other wireless communication adapters to use new functions as well as existing functions are known.

A function expansion device is installed in a portable information terminal by inserting the function expansion device into an installation part of the portable information terminal. Performing wired connection via a signal line for information exchange enables information processed in the function expansion device to be received in the portable information terminal and enables information processed in the portable information terminal to be received in the function expansion device.

In many cases, for a combination of a portable information terminal and an input/output system function expansion device, such as a combination of a PDA and a camera adapter or a combination of a PDA and a headphone, wireless connection provides a higher degree of flexibility in a positional relationship of the portable information terminal and the function expansion device. Thus, wireless connection is more convenient and applicable for various uses, compared with wired connection.

In view of such circumstances, methods for performing information exchange by connecting a portable information terminal and a function expansion device using a local wireless communication system has been used.

Information exchange performed by wirelessly connecting a portable information terminal and a function expansion device using a local wireless communication system provides a higher flexibility in usage. However, since portable information terminals and function expansion devices that are provided with the same type of wireless communication system can be wirelessly connected to each other, an unwanted terminal may be connected to a portable information terminal and information may be captured by the unwanted terminal. Also, there are significantly more possibilities that unnecessary information is input and that information being transferred between the portable information terminal and the function expansion device is secretly looked at, compared with wired connection.

In order to solve the above problems, a procedure for using a personal identification number (a connection authentication code) is known. This procedure includes a method in which the same personal identification number is input to a portable information terminal and to a function expansion device, the personal identification numbers stored in the portable information terminal and the function expansion device are compared with each other when connection is performed, and connection is authenticated only when the personal identification number stored in the portable information terminal is equal to the personal identification number stored in the function expansion device, and a method in which transfer data is encrypted, locking is performed using a personal identification number, and a receiver decrypts the transfer data using the personal identification number as a key.

In the known procedure for using personal identification numbers, a user must input a personal identification number to a portable information terminal and to a function expansion device that are to be wirelessly connected to each other. Also, a user must consider a number sequence, a character sequence, or a combination of numbers and characters in order to create a personal identification number. Thus, creating a personal identification number is a very troublesome operation. Also, generally, personal identification numbers created by users are mostly guessable. Thus, users fear that their personal identification numbers will be guessed.

SUMMARY OF THE INVENTION

An object of the present invention is to easily perform processing for connection authentication without reducing security in an information processing apparatus and a function expansion device that are capable of wired connection and wireless connection.

According to the present invention, authentication information for wireless connection is generated and stored when a function expansion device is wire-connected to an information processing apparatus. Thus, connection authentication for wireless connection can be easily performed without reducing the security.

Also, when separation between the information processing apparatus and the function expansion device is detected, authentication for wireless connection is performed using the authentication information automatically stored when wired connection is performed. Thus, operation for wireless communication can be easily performed.

Also, automatically generating authentication information simplifies user operation.

Also, an automatically generated authentication code and individual identification information of a wireless connection part function as authentication information. Thus, authentication can be performed with higher security compared with a case where authentication is performed using only an authentication code.

Further objects, features and advantages of the present invention will become apparent from the following description of the preferred embodiments with reference to the attached drawings.

BRIEF DESCRIPTION OF THE DRAWINGS

FIG. 3 is a block diagram showing a specific structure of the portable information terminal and the function expansion device according to the first embodiment.

FIG. 4 includes flowcharts showing a process performed by the portable information terminal and the function expansion device according to the first embodiment.

FIG. 5 shows a PIN code storage table provided in the portable information terminal and the function expansion device according to a second embodiment of the present invention.

DESCRIPTION OF THE PREFERRED EMBODIMENTS

Embodiments of the present invention will be described.

First Embodiment

Figure 1A:
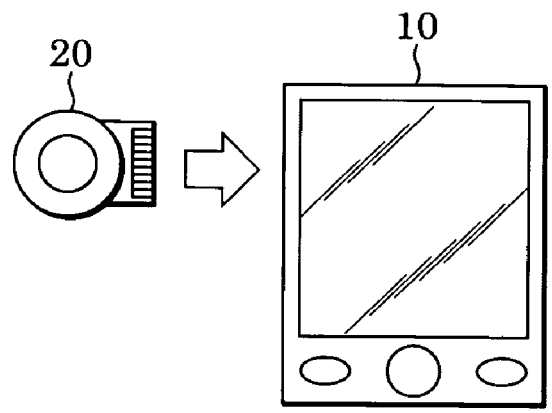
FIGS. 1A and 1B show a portable information terminal and a function expansion device according to a first embodiment of the present invention.
Figure 1B:
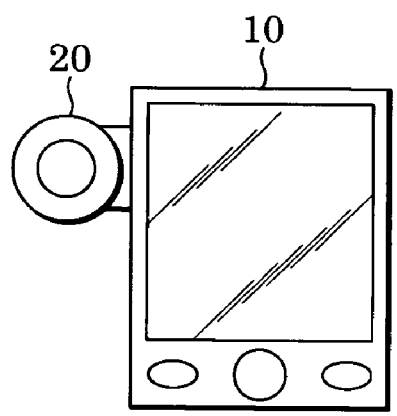

FIGS. 1A and 1B show a portable information terminal 10 and a function expansion device 20 according to a first embodiment of the present invention.

The portable information terminal 10 is a personal digital assistant (PDA) and the function expansion device 20 is a camera adapter. A PDA provided with a camera function is formed by installing the camera adapter, which is the function expansion device 20, into the PDA, which is the portable information terminal 10. Also, each of the portable information terminal 10 and the function expansion device 20 includes Bluetooth® as local wireless communication means.

Figure 2:
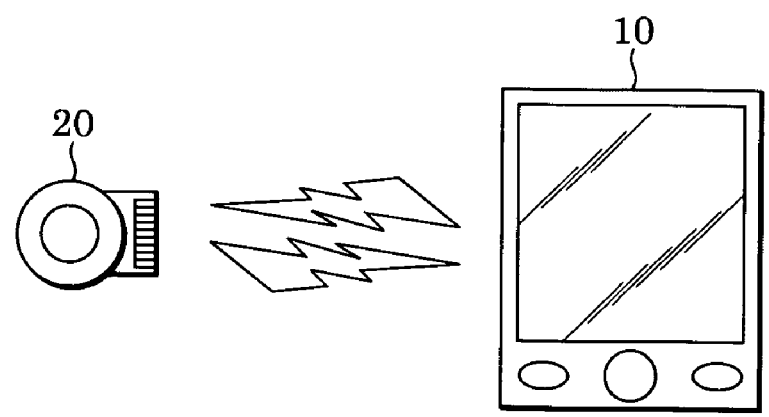
FIG. 2 illustrates that the portable information terminal and the function expansion device according to the first embodiment that are separated from each other are wirelessly connected to each other and perform communication.

FIG. 2 illustrates that communication is performed by wirelessly connecting the portable information terminal 10 and the function expansion device 20, which are separated from each other, using Bluetooth functioning as the local wireless communication means, which are installed in the portable information terminal 10 and the function expansion device 20.

As shown in FIG. 2, a function of the camera adapter, which is the function expansion device 20, is added to the PDA, which is the portable information terminal 10, to form a PDA provided with the camera function, as in a case where the function expansion device 20 is installed in the portable information terminal 10, by wirelessly connecting the function expansion device 20 to the portable information terminal 10.

FIG. 3 is a block diagram showing specific structures of the portable information terminal 10 and the function expansion device 20.

The portable information terminal 10 includes a portable information terminal unit 11, wireless communication means 12, an antenna 13, a connection authentication code storing unit 14, a connection authentication code setting unit 15, an installation detecting unit 16, and an information exchange signal line 17.

The portable information terminal unit 11 performs processing as a known portable information terminal. The wireless communication means 12 performs local wireless communication by Bluetooth communication. The antenna 13 performs local wireless communication. The connection authentication code storing unit 14 stores a connection authentication code necessary for connection authentication when local wireless communication is performed.

The connection authentication code setting unit 1S has a function to generate the connection authentication code, to set the generated connection authentication code in the connection authentication code storing unit 14 of the portable information terminal 10 and in a connection authentication code storing unit 24 of the function expansion device 20, and to confirm that the setting in the connection authentication code storing unit 24 is properly performed.

The installation detecting unit 16 detects installation of the function expansion device 20 in the portable information terminal 10 and outputs a detection signal. The information exchange signal line 17 wire-connects the connection authentication code setting unit 15 and the installation detecting unit 16 to an information exchange signal line 25 of the function expansion device 20.

The function expansion device 20 includes a function expansion device unit 21, wireless communication means 22, an antenna 23, the connection authentication code storing unit 24, and the information exchange signal line 25.

The function expansion device unit 21 performs processing as a camera for function expansion. The wireless communication means 22 performs local wireless communication by Bluetooth communication. The antenna 23 performs local wireless communication. The connection authentication code storing unit 24 stores a connection authentication code necessary for connection authentication when local wireless communication is performed. The information exchange signal line 25 is wire-connected to the information exchange signal line 17 of the portable information terminal 10.

A process performed by the portable information terminal 10 and the function expansion device 20 will now be described.

FIG. 4 includes flowcharts showing the process performed by the portable information terminal 10 and the function expansion device 20.

When the power of the portable information terminal 10 is turned on, initialization is performed (step S10). When the power of the function expansion device 20 is turned on, initialization is performed (step S20). In the initialization processing, each of the portable information terminal 10 and the function expansion device 20 starts an application and sets various parameters.

When the function expansion device 20 is installed in an installation part of the portable information terminal 10, the information exchange signal line 17 is wire-connected to the information exchange signal line 25. When detecting installation of the function expansion device 20 in the portable information terminal 10, the installation detecting unit 16 outputs a detection signal to the connection authentication code setting unit 15 (step S11). The installation detecting unit 16 is a sensor including, for example, a physical switch or an electric switch for detecting installation.

When receiving the detection signal, the connection authentication code setting unit 15 generates a connection authentication code. The code generated may be, for example, a random number or a timer value (step S12).

The connection authentication code setting unit 15 sends the generated connection authentication code to the connection authentication code storing unit 14 to be stored therein. Also, the connection authentication code setting unit 15 sends the generated connection authentication code to the connection authentication code storing unit 24 via the information exchange signal line 17 and the information exchange signal line 25 to be stored in the connection authentication code storing unit 24 (steps S13 and S21).

The connection authentication code storing unit 24 of the function expansion device 20 stores the received connection authentication code. Then, the connection authentication code storing unit 24 sends the received connection authentication code to the connection authentication code storing unit 14 via the information exchange signal line 25 and the information exchange signal line 17. The connection authentication code storing unit 14 receives and stores the connection authentication code (step S22).

At this time, the connection authentication code setting unit 15 determines whether or not the connection authentication code sent to the connection authentication code storing unit 14 is equal to the connection authentication code that the connection authentication code setting unit 15 sent to the connection authentication code storing unit 14. If the connection authentication code sent to the connection authentication code storing unit 14 is determined to be equal to the connection authentication code that the connection authentication code setting unit 15 sent to the connection authentication code storing unit 14, it is determined that setting of the connection authentication code is successfully completed.

If it is determined that setting of a connection authentication code is not successfully completed, the connection authentication code setting unit 15 generates a connection authentication code again and repeats the processing described above (step S14).

By performing the steps described above, only installing the camera adapter, which is the function expansion device 20, in the PDA, which is the portable information terminal 10, enables a connection authentication code to be set in each of the portable information terminal 10 and the function expansion device 20.

A case where the camera adapter is actually used after completing the setting of the connection authentication code will be described.

The function expansion device 20 is not necessarily installed in the portable information terminal 10. The function expansion device 20 is wirelessly connected to the portable information terminal 10 via local wireless communication in a separated state and is used as a wireless camera. However, the function expansion device 20 may be operated by wired connection, instead of wireless connection, in an installed state.

Here, a case where the function expansion device 20 is separated from the portable information terminal 10 after completing the setting of the connection authentication code will be described with reference to FIG. 6.

When the installation detecting unit 16 of the portable information terminal 10 detects separation of the function expansion device 20 (step S610), the portable information terminal 10 sends the function expansion device 20 a request for wireless connection (step S611). The function expansion device 20 receives the request for wireless connection (step S620), and sends back a response to the portable information terminal 10. Authentication processing using the connection authentication code is performed between the portable information terminal 10 and the function expansion device 20 (steps S612 and S621). Since the connection authentication code is set in each of the portable information terminal 10 and the function expansion device 20 when the function expansion device 20 is installed in the portable information terminal 10, the set connection authentication code is automatically read from each of the connection authentication code storing unit 14 and the connection authentication code storing unit 24 to be used for the connection authentication. For example, the read connection authentication codes are exchanged and compared. If it is determined from the result of comparison that the stored connection authentication code is equal to the received connection authentication code, a fact of the coincidence is sent to the respective communication destination. If each of the portable information terminal 10 and the function expansion device 20 receives a fact of the coincidence from the respective communication destination, authentication is succeeded. If authentication is succeeded, the function expansion device 20 is wirelessly connected to the portable information terminal 10.

If separation is not detected, the portable information terminal 10 operates in a state of wired connection (step S613).

As described above, if an authentication code is stored in each of a portable information terminal and a function expansion device via wired communication when the function expansion device is wire-connected to the portable information terminal, the function expansion device can be wirelessly connected to the portable information terminal by authentication using the authentication code. Thus, when wireless connection is performed, users do not need to input the connection authentication code. Also, connection authentication can be performed without causing users to be aware of a connection authentication code but ensuring security. Furthermore, since the authentication code for wireless connection is automatically generated when the function expansion device is wire-connected to the portable information terminal, users are not required to input the authentication code when the authentication code is stored in each of the portable information terminal and the function expansion device.

Also, the connection authentication code stored in each of the connection authentication code storing unit 14 and the connection authentication code storing unit 24 may be overwritten every time the function expansion device 20 is installed in the portable information terminal 10. Alternatively, the connection authentication code may be deleted by an instruction by a user.

Second Embodiment

FIG. 5 shows a personal identification number (PIN) code storage table used in a second embodiment of the present invention. Each of the portable information terminal 10 and the function expansion device 20 includes, for example, the PIN code storage table shown in FIG. 5.

The second embodiment is basically equal to the first embodiment. Thus, the portable information terminal 10 and the function expansion device 20 according to the second embodiment are equal to the portable information terminal 10 and the function expansion device 20 according to the first embodiment shown in FIG. 3.

However, the second embodiment is different from the first embodiment in that each of the connection authentication code storing units 14 and 24 stores an individual identification number (BD_ADDR) of a communication destination, which is a Bluetooth device address, as well as a PIN code as a connection authentication code.

A process according to the second embodiment will be described.

The process according to the second embodiment is basically equal to the process according to the first embodiment. Thus, the process according to the second embodiment will also be described with reference to the flowcharts shown in FIG. 4.

When the power of the portable information terminal 10 and the function expansion device 20 are turned on, initialization is performed. Here, each of the portable information terminal 10 and the function expansion device 20 starts an application and sets various parameters. Furthermore, the portable information terminal 10 sets an individual identification number (BD_ADDR) given to the wireless communication means 12 in the connection authentication code storing unit 14 as an own ID (step S10). Also, the function expansion device 20 sets an individual identification number (BD_ADDR) given to the wireless communication means 22 in the connection authentication code storing unit 24 as an own ID (step S20).

When the function expansion device 20 is installed in the installation part of the portable information terminal 10, the information exchange signal line 17 is wire-connected to the information exchange signal line 25. Also, when detecting installation of the function expansion device 20 in the portable information terminal 10, the installation detecting unit 16 outputs a detection signal to the connection authentication code setting unit 15 (Step S11). The installation detecting unit 16 is a sensor including, for example, a physical switch or an electric switch for detecting installation.

After receiving the detection signal, the connection authentication code setting unit 15 generates a PIN code as a connection authentication code. The code generated may be a random number or a timer value (step S12). The connection authentication code setting unit 15 sends the generated connection authentication code to the connection authentication code storing unit 14 to be stored therein. Also, the connection authentication code setting unit 15 sends the generated connection authentication code and the individual identification number given to the wireless communication means 12 to the connection authentication code storing unit 24 via the information exchange signal line 17 and the information exchange signal line 25 to be stored in the connection authentication code storing unit 24 (steps S13 and S21).

The connection authentication code storing unit 24 of the function expansion device 20 stores the received connection authentication code and individual identification number so as to be associated with each other, as shown in FIG. 5. Then, the connection authentication code storing unit 24 sends the received connection authentication code and the individual identification number given to the wireless communication means 22 to the connection authentication code storing unit 14 via the information exchange signal line 25 and the information exchange signal line 17. After receiving the connection authentication code and individual identification number from the function expansion device 20, the connection authentication code storing unit 14 stores the connection authentication code and the individual identification number so as to be associated with each other, as shown in FIG. 5 (step S22).

Here, the connection authentication code setting unit 15 determines whether or not the connection authentication code sent to the connection authentication code storing unit 14 is equal to the connection authentication code that the connection authentication code setting unit 15 sent to the connection authentication code storing unit 14. If the connection authentication code sent to the connection authentication code storing unit 14 is determined to be equal to the connection authentication code that the connection authentication code setting unit 15 sent to the connection authentication code storing unit 14, it is determined that setting of the connection authentication code is successfully completed.

If it is determined that setting of a connection authentication code is not successfully completed, the connection authentication code setting unit 15 generates a connection authentication code again and repeats the processing described above (step S14).

By performing the steps described above, only installing the camera adapter, which is the function expansion device 20, in the PDA, which is the portable information terminal 10, enables a connection authentication code and an individual identification number of a connection destination to be set in each of the portable information terminal 10 and the function expansion device 20.

A case where the camera adapter is actually used after completing the setting of the connection authentication code will be described.

The function expansion device 20 is not necessarily installed in the portable information terminal 10. The function expansion device 20 is wirelessly connected to the portable information terminal 10 in a separated state and is used as a wireless camera. However, the function expansion device 20 may be operated by wired connection, instead of wireless connection, in an installed state.

Figure 6:
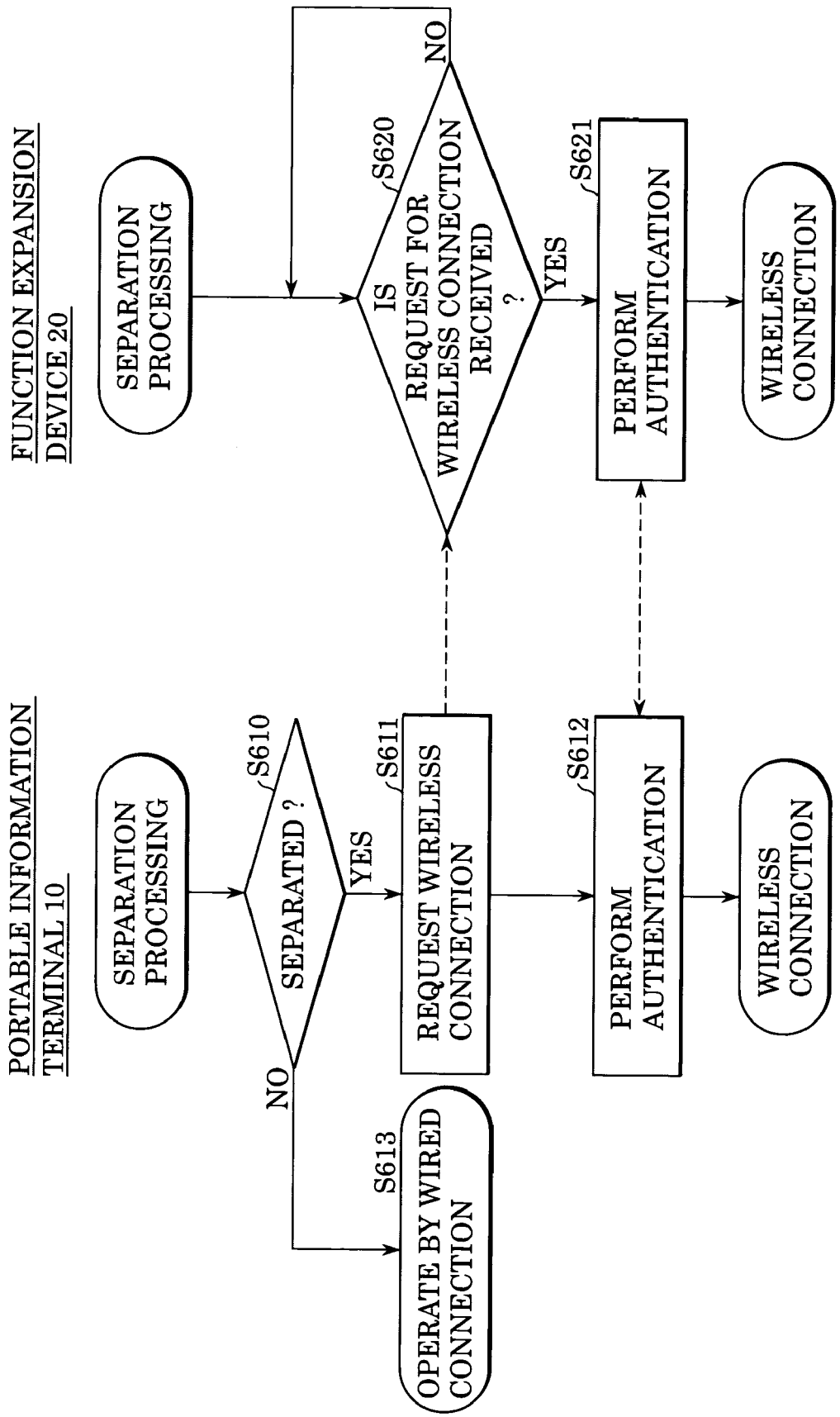
FIG. 6 includes flowcharts showing a process performed by the portable information terminal and the function expansion device according to the first and second embodiments of the present invention.

When the function expansion device 20 is separated from the portable information terminal 10 after completing the setting of the connection code, the portable information terminal 10 and the function expansion device 20 operate as shown in FIG. 6, which is referred to for the explanation for the first embodiment.

For authentication between the portable information terminal 10 and the function expansion device 20 (steps S612 and S621), in addition to authentication using a PIN code, individual identification numbers given to the wireless communication means 12 and 22 are exchanged between the portable information terminal 10 and the function expansion device 20. If the individual identification numbers are equal to individual identification numbers of the respective communication destinations corresponding to the PIN code stored in step S13 or S21 shown in FIG. 4, it is determined that authentication is successfully completed.

As described above, according to the second embodiment, authentication is performed using an individual identification number corresponding to a connection authentication code, as well as using the connection authentication code. Thus, authentication can be performed with greatly increased security.

Also, as shown in FIG. 5, storing a plurality of PIN codes and individual identification numbers enables authentication information among a plurality of communication destinations to be stored. Thus, such a portable information terminal can use various function expansion devices. Also, such a function expansion device can be used for various portable information terminals.

Also, when the number of individual identification numbers and connection authentication codes stored in PIN code storage tables in connection authentication code storing units exceeds the storable number, the individual identification numbers and the connection authentication codes may be overwritten. Alternatively, the individual identification numbers and the connection authentication codes may be selectively deleted or all the individual identification numbers and the connection authentication codes may be deleted.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system including an information processing apparatus and a wireless device, comprising:
   a wired connection unit adapted to wire-connect the wireless device to the information processing apparatus;
   a wireless communication unit adapted to wirelessly communicate between the wireless device and the information processing apparatus;
   a storing unit adapted to store authentication information obtained based on wired communication by the wired connection unit, the authentication information being used for authentication when wireless communication is performed by the wireless communication unit;
   a separation detecting unit adapted to detect separation of the wired connection between the wireless device and the information processing apparatus; and
   an authentication unit adapted to start the authentication using the authentication information stored by the storing unit for wireless communication between the wireless device and the information processing apparatus in accordance with detection by the separation detecting unit.

2. The system according to claim 1, further comprising a generating unit adapted to generate the authentication information in accordance with detection of wired connection by the wired connection unit, and
   wherein the storing unit is adapted to send the authentication information generated by the generating unit to a communication destination by the wired communication and to cause the authentication information to be stored in a memory of the communication destination.

3. The system according to claim 2, wherein the storing unit is adapted to cause the authentication information generated by the generating unit to be stored in a memory of the wireless device and a memory of the information processing apparatus.

4. The system according to claim 1, wherein the authentication information stored by the storing unit and individual identification information of the wireless device or the information processing apparatus are associated with each other.

5. The system according to claim 1, further comprising:
   a detecting unit adapted to detect wired connection between the wireless device and the information processing apparatus by the wired connection unit,
   wherein the storing unit is adapted to store the authentication information in accordance with detection by the detecting unit.

6. An information processing apparatus comprising:
   a wired connection unit adapted to be wire-connected to a wireless device;
   a wireless communication unit adapted to wirelessly communicate with the wireless device;
   a storing unit adapted to cause authentication information used for authentication when wireless communication is performed by the wireless communication unit to be stored in the wireless device by wired communication by the wired connection unit;
   a separation detecting unit adapted to detect separation of wired connection between the wireless device and the information processing apparatus; and
   an authentication unit adapted to start the authentication using the authentication information stored by the storing unit for the wireless communication between the wireless device and the information processing apparatus in accordance with detection by the separation detecting unit.

7. The information processing apparatus according to claim 6, further comprising a generating unit adapted to generate authentication information in accordance with detection of wired connection by the wired connection unit,
   wherein the storing unit is adapted to cause the authentication information generated by the generating unit to be stored in the wireless device.

8. The information processing apparatus according to claim 6, wherein the authentication information stored in the wireless device by the storing unit and individual identification information of the wireless device are associated with each other.

9. The system according to claim 6, further comprising:
   a detecting unit adapted to detect wired connection with the wireless device by the wired connection unit,
   wherein the storing unit is adapted to cause the authentication information to be stored in accordance with detection by the detecting unit.

10. The system according to claim 6, wherein the storing unit is adapted to cause the authentication information to be stored in the information processing apparatus.

11. An authentication method for an information processing apparatus including wired connection means for being wire-connected to an external device and wireless communication means wirelessly communicating with the external device, comprising:
    a setting step of setting authentication information used for authentication when wireless communication is performed between the information processing apparatus and the external device by wired communication with the external device;
    a separation detecting step of detecting separation of the wired connection between the external device and information processing apparatus; and
    an authentication step of starting authentication using the authentication information set in the setting step for the wireless communication between the external device and the information processing apparatus in accordance with detection in the separation detecting step.

* * * * *